Aug. 2, 1932.                C. SKLAREK                1,869,984
                    MOUNTING FOR DIRIGIBLE LIGHTS
                        Filed Sept. 29, 1930
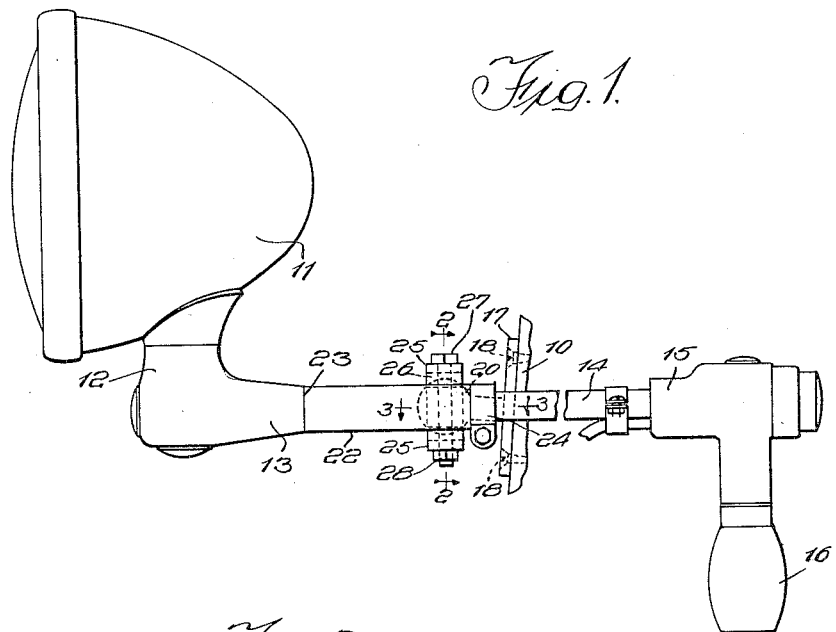
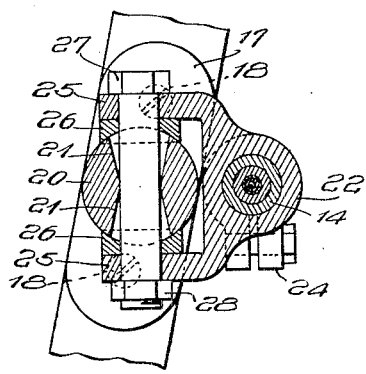
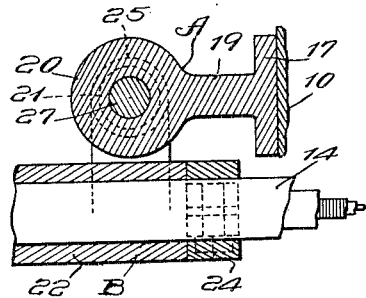
Witness:
William P. Kilroy
Inventor:
Clifford Sklarek
By Joseph Harris
His Atty Patented Aug. 2, 1932

1,869,984

UNITED STATES PATENT OFFICE

CLIFFORD SKLAREK, OF CHICAGO, ILLINOIS, ASSIGNOR TO INTERNATIONAL SPOTLIGHT CORPORATION, OF CHICAGO, ILLINOIS, A CORPORATION OF ILLINOIS

MOUNTING FOR DIRIGIBLE LIGHTS

Application filed September 29, 1930. Serial No. 485,000.

This invention relates to improvements in mountings for dirigible lights.

In the application of dirigible or so-called spotlights to automobiles and other automotive vehicles, a wide variety of conditions is encountered, particularly in connection with the application of such lights to open type cars. The slope of the windshields varies greatly as does also their widths and the location of the posts to which the spotlights are usually attached at one side of the windshields. Due to these variations, considerable difficulty has heretofore been experienced in providing a suitable attachment for the spotlights to permit the latter to be mounted at the desired angles with respect to the horizontal and vertical planes.

An object of my invention, therefore, is to provide a simple and efficient universally adaptable mounting for dirigible lights, which mounting is particularly adapted for open type automobiles and whereby the light may be adjusted at any desired angle in the horizontal and vertical planes, regardless of the variations of slope of windshield and other factors.

In the drawing forming a part of this specification, Figure 1 is a side, elevational view, showing a dirigible light mounted on a sloping windshield structure in accordance with my invention. Figure 2 is a vertical, sectional view upon an enlarged scale corresponding to the line 2—2 of Figure 1. And Figure 3 is a horizontal enlarged sectional view corresponding to the line 3—3 of Figure 1.

In said drawing, 10 indicates the post or other fixed part of the superstructure of an open type car on which the dirigible light or spotlight is adapted to be mounted. The dirigible light may be of any well known type, that shown more or less conventionally in the drawing comprising a lamp casing 11, rotatably mounted about a vertical axis with respect to a head housing 12, the latter having a horizontal extension 13 to which is rigidly secured a tubular connection 14 extended rearwardly or inwardly and to the inner end of which is fixed a handle housing 15, the latter carrying a handle proper 16 by which rotation of the casing 11 is effected about a vertical axis and rotation of the entire assembly is effected about a horizontal axis. A light of this type is disclosed in detail in my co-pending application Serial No. 485,001, filed of even date herewith.

In carrying out my invention, I employ an attaching bracket A and a bearing sleeve B. The bracket A is formed with an elongated base or flange 17 adapted to be segated to the post or edge of the windshield by suitable means, such as the screws 18—18. From the base 17 is extended forwardly an arm 19, which, at its outer end, is enlarged to form a ball 20, the latter being bored so as to provide two oppositely extended, conical recesses 21—21, as shown in Figure 2.

The bearing sleeve B comprises an elongated, tubular section 22 within which is rotatably journaled the tubular connection 14 of the light proper. Said sleeve 22 has shouldered contact, as indicated at 23, with the lamp head housing 12 so as to limit movement of the latter toward the right, as viewed in Figure 1, and the tubular connection 14 has secured thereto at the inner end of the sleeve 22, a friction split ring 24, as shown best in Figure 3, whereby endwise movement of the tubular connection 14 is prevented with respect to the bearing sleeve B. Said bearing sleeve B, as shown in Figure 2, is formed with two vertically spaced, laterally extended arms or forks 25—25 with plane opposed parallel faces and which straddle the ball 20 and are somewhat spaced therefrom. Interposed between each of the arms 25 and the ball 20 is a washer 26 having a flat outer face and an inner ball or spherical face. The washers and the arms 25 are provided with vertically alined openings to receive the shank of a bolt 27 to the lower end of which is applied a nut 28. Said bolt is extended through the aperture 21—21 of the ball 20, as shown in Figure 2, and, when the parts are in proper adjusted position, the nut 28 is tightened so as to frictionally grip and retain the parts in such adjusted position.

As will be evident from an inspection of the drawing, the light is adjustable in a horizontal plane about the vertical axis of the bolt 27. Also due to the ball face engagement of the washers 26 and ball 20 and the conical recesses 21—21, the bolt and the sleeve bearing member B carried thereby may be adjusted about any axis in a horizontal plane passing through the center of the ball 20, thus providing a universal adjustment of the light with respect to the support 10. By employing opposed parallel flat faces on the arms 25 of the bearing sleeve and on the outer faced washers 26, it will be evident that the ball section and washers assembled thereon may be inserted as a unit, laterally, between the arms 25 and the latter made integral or rigid.

From the preceding description, it will be seen that my improved mounting comprises few parts, each inexpensive to manufacture, and the mounting provides for any desired position of the light with respect to the superstructure to which it is attached and adjustments may be made from time to time without the necessity of disassembling any of the parts.

Although I have herein shown and described what I now consider the preferred manner of carrying out my invention, the same is merely illustrative and I contemplate all changes and modifications that come within the scope of the claims appended hereto.

I claim:

1. In a mounting of the character described, the combination with a bearing member; of a bracket member adapted to be attached to a support; means providing universal adjustment between said members, said means including: a ball section on one of said members; rigid, integrally formed spaced arms on the other of said members adapted to straddle the ball section, the inner opposed faces of said arms being plane and parallel; a washer interposed between each arm and the ball section, each washer having an outer flat face and an inner spherical face to fit the ball section, whereby the washers assembled on the ball section may be inserted laterally as a unit between the rigid arms; and devices for clamping said arms, washers and ball section tightly together in adjusted position.

2. In a mounting of the character described, the combination with a bearing member having laterally extended, rigid, spaced arms, the latter being provided with flat parallel opposed faces; of a bracket adapted to be attached to a support, the said bracket having a ball section with oppositely flaring recesses therein; a washer interposed between each of said arms and the ball section, each washer having a flat outer face and a spherical inner face, whereby the ball section with the washers thereon are adapted to be inserted laterally as a unit between said spaced arms; and a pivot element extending through said arms, washers and recesses of the ball section.

In witness that I claim the foregoing I have hereunto subscribed my name this 24th day of September 1930.

CLIFFORD SKLAREK.